(12) United States Patent
Akatsu et al.

(10) Patent No.: US 6,234,463 B1
(45) Date of Patent: May 22, 2001

(54) VIBRATION INSULATING DEVICE AND ASSEMBLY METHOD THEREOF

(75) Inventors: Yousuke Akatsu, Yokohama; Shigeki Satou, Chigasaki; Takeshi Kimura, Yokosuka; Kazushige Aoki, Isehara, all of (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/253,069

(22) Filed: Feb. 19, 1999

(30) Foreign Application Priority Data

Feb. 20, 1998 (JP) .................................................. 10-038313

(51) Int. Cl.[7] ................................. F16F 5/00; F16F 9/00; F16F 13/00; F16F 15/00; F16M 5/00
(52) U.S. Cl. ......................................................... 267/140.15
(58) Field of Search ........................ 267/140.15, 140.14, 267/140.11; 248/550, 562

(56) References Cited

U.S. PATENT DOCUMENTS

| 5,718,417 | 2/1998 | Aoki | 267/140.14 |
| 5,947,456 | * 9/1999 | Aoki | 267/140.14 |
| 6,032,937 | * 3/2000 | Kojima | 267/140.14 |

FOREIGN PATENT DOCUMENTS

| 196 41 239 | 4/1997 | (DE) . |
| 0 855 535 | 7/1998 | (EP) . |
| 9-250590 | 9/1997 | (JP) . |
| 10-252817 | 9/1998 | (JP) . |

OTHER PUBLICATIONS

Patent Abstracts of Japan, vol. 1998, No. 01, Jan. 30, 1998 & JP 09 242813 A (Nissan Motor Co. Ltd.), Sep. 16, 1997 (Sep. 16, 1997).

* cited by examiner

Primary Examiner—Robert J. Oberleitner
Assistant Examiner—C. T. Bartz
(74) Attorney, Agent, or Firm—Foley & Lardner (57) ABSTRACT

A disclosed vibration insulating device, which is interposed between a vibrating body and a mounting body, includes a fluid chamber fluid filled with fluid, an elastic support partly defining the fluid chamber, a movable member partly defining the fluid chamber, a supporting member supporting the movable member, an actuator opposed to the movable member, the actuator that generates displacement force to displace the movable member, and a gap holding member disposed between the supporting member and the actuator. The gap holding member maintains a gap between the actuator and the movable member. Also, according to a disclosed assembly method of the vibration insulating device, the movable member is supported so as to oppose the actuator by using the supporting member and the gap holding member such that it is capable of being displaced with respect to the actuator. Here, in the method, the gap holding member is positioned between the movable member and the actuator.

20 Claims, 3 Drawing Sheets

VIBRATION INSULATING DEVICE AND ASSEMBLY METHOD THEREOF

BACKGROUND OF THE INVENTION

This invention relates to a vibration insulating device which mounts a vibrating body such as an engine on a mounting body such as a vehicle body while insulating vibration and an assembly method thereof, and particularly to a vibration insulating device in which a fluid chamber accommodating fluid is defined by an elastic support disposed between the vibrating body and the mounting body so as to change a volume of the fluid chamber actively, thereby reducing vibration transmission rate by using that active mounting force and an assembly method thereof.

Japanese Patent Application Laid-Open No. H9-250590 (Japanese Patent Application No. H8-59219) discloses a vibration insulating device having a fluid chamber accommodating fluid so as to change a volume of the fluid chamber actively.

SUMMARY OF THE INVENTION

Because in a conventional vibration insulating device having a fluid chamber in which a volume of the fluid chamber is changed actively, a movable member which can be vibrated when the volume of the fluid chamber is changed is used, a gap between the movable member and its surrounding part like a connecting member which communicates with a mounting body like a vehicle body needs to be maintained accurately in a direction in which the stroke of the vibration is changed. For example, in a case that an electromagnetic actuator is used to vibrate the movable member, the movable member is often so designed that the vibration stroke thereof with respect to the electromagnetic actuator is changed. Therefore, it is important to apply a magnetic force of the electromagnetic actuator appropriately to the movable member and specify the gap between the movable member and the electromagnetic actuator accurately so as to make the movable member vibrate at a necessary stroke. The importance of maintaining the gap between the movable member and the electromagnetic actuator accurately is increased as the vibration insulation characteristic required for the vibration insulating device is increased.

However, according to consideration of the present inventors and the like, because the gap between the movable member and the electromagnetic actuator positioned on the side of the mounting body is affected by error in dimensions of the components disposed around the movable member and error in characteristic such as resilient force and magnetic force, it is very difficult to settle the gap between the movable member and the electromagnetic actuator within a predetermined strict allowance at the time of assembly of the vibration insulating device. Although, as the countermeasure, minimizing the error in dimension of the components and error in physical characteristic or the like can be considered, this countermeasure is not favorable in a case of mass production when cost or the like of the vibration insulating device are taken into account. If such a condition regarding mass production or the like of the vibration insulating device are considered, an effective countermeasure on assumption that the gap between the movable member and the electromagnetic actuator does not come within a predetermined allowance at a single assembly is demanded.

In a case that mass production or the like of the vibration insulating device are considered, it can be considered to first measure the gap between the movable member and the electromagnetic actuator at the time of assembly, previously prepare some kind of adjusting part and then make adjustment with the adjusting part so that the gap between the movable member and the electromagnetic actuator comes into its allowance. Although such an adjusting part is desired to be disposed in the vicinity of the movable member and electromagnetic actuator in viewpoints of accuracy of the adjustment, generation of an excessive step such as a step for disassembling already installed components should be avoided if mass production or the like are considered. Such an excessive disassembly process for the components which is essentially not necessary may introduce a new error factor at the time of reassembly or damage the components at worst, therefore the disassembly process should be eliminated in any case.

The present invention has been achieved based on the considerations described above by the inventors and the like, and therefore, an object of the invention is to provide a vibration insulating device including a movable member positioned accurately as required to ensure a high vibration insulation characteristic, having a high suitability to mass production at the time of assembly and in which a necessity of disassembling the already installed components of the vibration insulating device is eliminated, and an assembly method thereof.

To achieve the above object, the present invention provides a vibration insulating device, which is interposed between a vibrating body and a mounting body, includes a fluid chamber fluid filled with fluid, an elastic support partly defining the fluid chamber, a movable member partly defining the fluid chamber, a supporting member supporting the movable member, an actuator opposed to the movable member, the actuator that generates displacement force to displace the movable member, and a gap holding member disposed between the supporting member and the actuator. Here the gap holding member maintains a gap between the actuator and the movable member.

In other words, such a vibration insulating device includes a fluid chamber filled with fluid, an elastic support partly defining the fluid chamber, a movable member partly defining the fluid chamber, means for supporting the movable member, means for displacing the movable member, and position adjusting means, provided between the means for displacing and the elastic support, for adjusting a gap between the movable member and the means for displacing.

On the other hand, the assembly method of the vibration insulating device of the present invention includes a step of preparing an elastic support connecting to a vibrating body and partly defining a fluid chamber, a step of preparing a movable member partly defining the fluid chamber, a step of preparing a supporting member supporting the movable member, a step of preparing an actuator generating force to displace the movable member and connecting to a mounting body, a step of preparing a gap holding member maintaining a gap between the movable member and the actuator, a step of supporting the movable member with the supporting member and the gap holding member in such a manner that the movable member is capable of being displaced and opposes the actuator. The gap holding member is positioned between the supporting member and the actuator. The assembly method further comprises a step of defining a fluid chamber accommodating a fluid with the elastic support and the movable member, and a volume of the fluid chamber is capable of being varied by a displacement of the movable member.

DETAILED DESCRIPTION OF THE PREFERRED EMBODIMENTS

Hereinafter, the embodiments of the present invention will be described in detail with reference to the accompanying drawings.

First of all, a vibration insulating device and an assembly method according to a first embodiment of the present invention will be described with reference to FIGS. 1–3.

Figure 1:
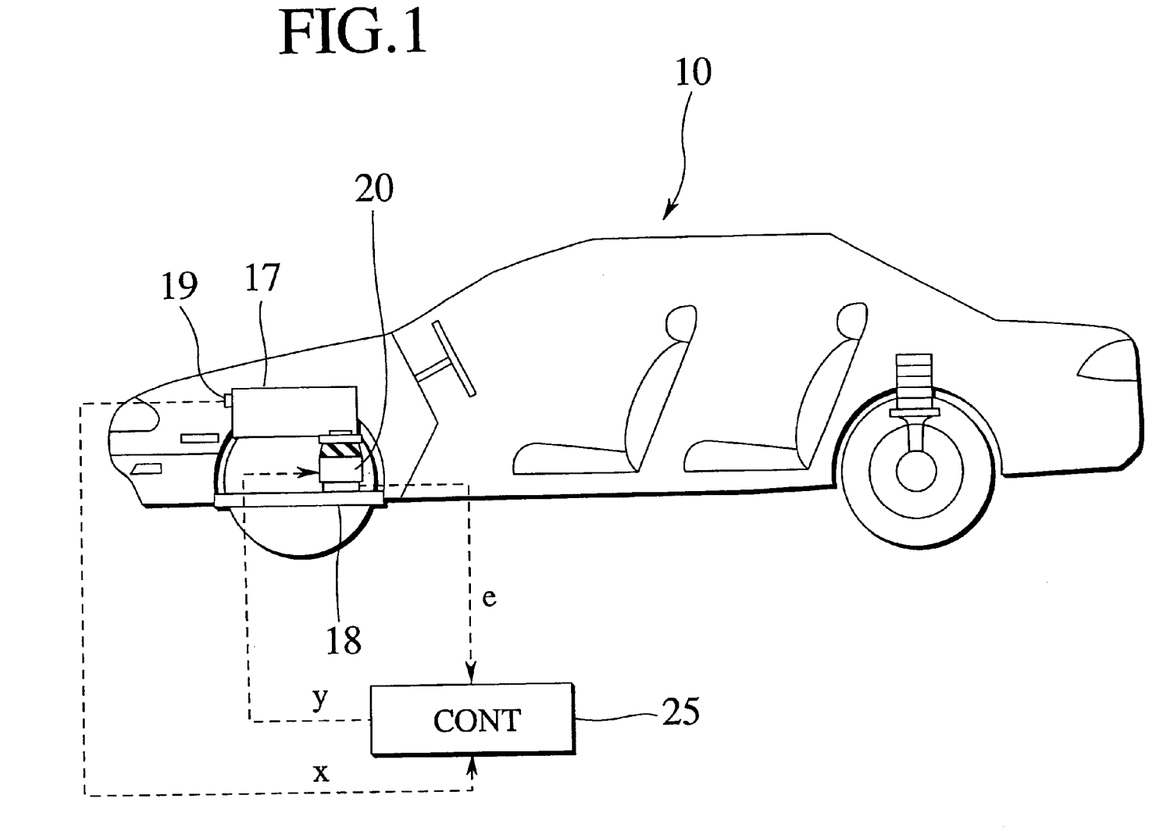
FIG. 1 is a schematic side view showing a vehicle to which a vibration insulating device according to a first embodiment of the present invention and an assembly method thereof are applied.

As shown in FIG. 1, in a vehicle 10, an engine (vibrating body) 17 is mounted to a vehicle body (mounting body) 18 constituted of suspension members or the like through a vibration insulating device (active engine mount) 20 capable of generating a force so as to reduce vibration transmitted from the engine 17 to the vehicle body 18 (which will be referred to as "active mounting force" hereinafter) in accordance with a driving signal. Actually, there are a plurality of engine mounts each of which generates passive mounting force depending on a relative displacement between the engine 17 and the vehicle body 18 in addition to the vibration insulating device 20, between the engine 17 and the vehicle body 18. As the passive engine mount, for example, a normal engine mount for mounting a load with a rubber-like resilient body, a known fluid charging type mount insulator in which a fluid is charged inside of a resilient body such as a rubber so as to generate a damping force or the like are available.

Figure 2:
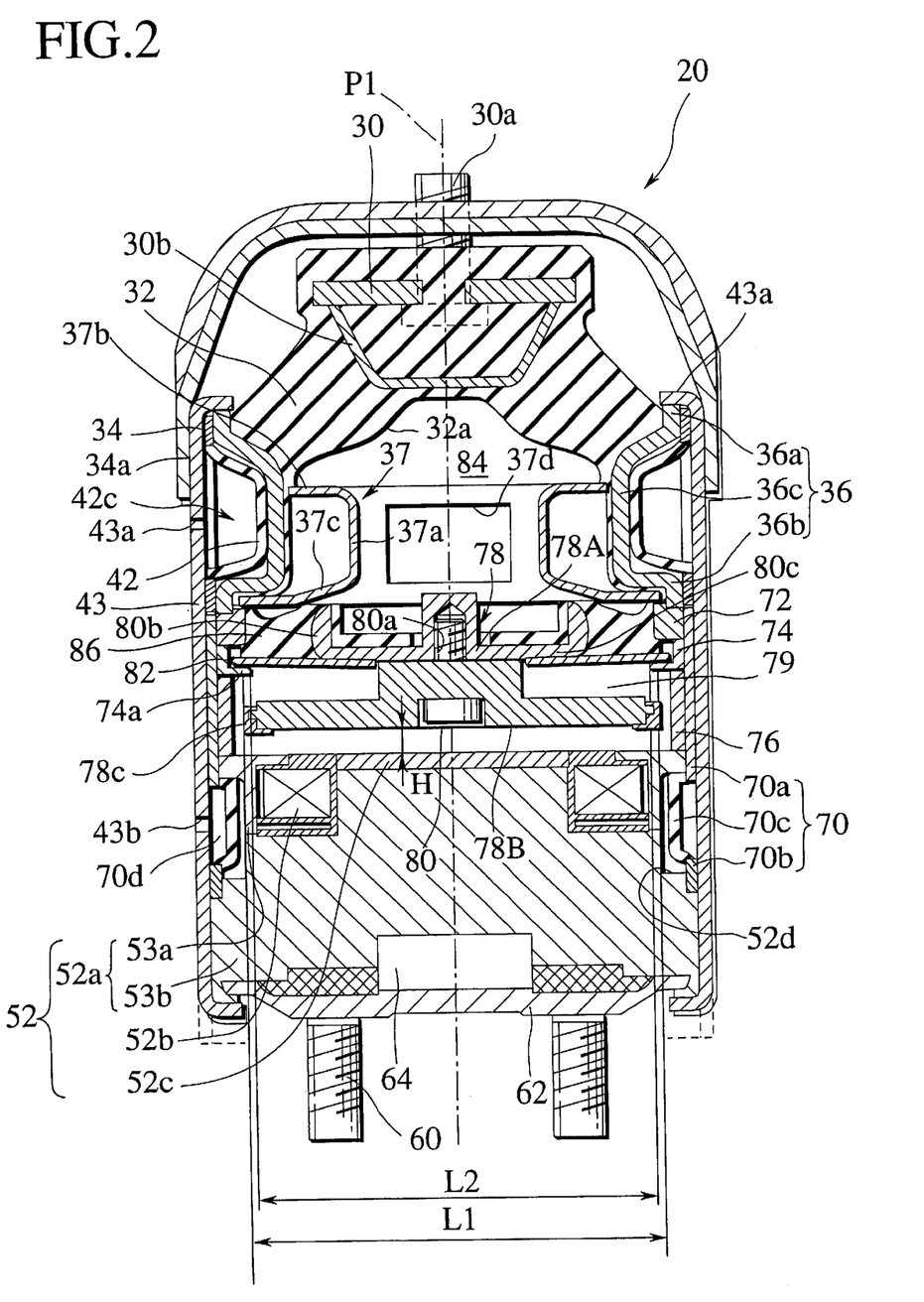
FIG. 2 is a sectional view of the vibration insulating device according to the first embodiment.

FIG. 2 shows a structure of the vibration insulating device 20. A device case 43 contains mount parts such as an outside cylinder 34, an orifice component 36, an inside cylinder 37, an elastic support 32 or the like. Below these mount parts, there are installed an electromagnetic actuator 52 which forms a part of partition wall of a main fluid chamber and displaces a resiliently mounted movable member in a direction in which a volume of the main fluid chamber is changed and a load sensor 64 which detects a vibration status of the vehicle body 18.

Namely, the vibration insulating device 20 of this embodiment contains an engine side connecting member 30 in which a connecting bolt 30a is fixed such that it faces upward. Below this engine side connecting member 30 is fixed a hollow cylinder body 30b having an inverse trapezoidal section.

On a lower side of the engine side connecting member 30 is fixed the elastic support 32 by vulcanized adhering by use of curing agent so as to cover the surfaces of the lower side of the engine side connecting member 30 and the hallow cylinder body 30b. This elastic support 32 is a substantially cylindrical resilient body which is inclined gradually downward from its center portion toward its peripheral portion. A hollow portion 32a having a mountainous section is formed inside of the elastic support 32. A thin-shaped bottom end portion of the elastic support 32 is fixed by vulcanized adhering by use of curing agent with an inside peripheral surface of the orifice component 36 in which an axis center $P_1$ (hereinafter referred to as mount axis) is coaxial with respect to the hollow cylinder body 30b. Here, the mount axis $P_1$ is a central axis of the vibration insulating device 20 and substantially corresponding to a vibrating body mounting direction (in this case, upward/downward direction in FIG. 2).

The orifice component 36 is a member in which a small-diameter cylinder portion 36c is formed continuously between a upper end cylinder portion 36a and a lower end cylinder portion 36b each having the same outside diameter so as to produce an annular concave portion on its outside surface. Although not shown, an opening portion is formed in the small-diameter cylinder portion 36c so that inside and outside of the orifice component 36 communicate with each other through this opening portion.

The outside cylinder 34 is fit to outside of the orifice component 36 and this outside cylinder 34 has the same inside diameter as the outside diameter of the upper end cylinder portion 36a and lower end cylinder portion 36b of the orifice component 36. The length in the axial direction of the outside cylinder 34 is the same as that of the orifice component 36. An opening portion 34a is formed in this outside cylinder 34. An outside periphery of a diaphragm 42 constituted of rubber made thin film resilient body is adhered to an edge portion of the opening portion 34a so as to close the opening portion 34a such that the diaphragm 42 is bent inward of the outside cylinder 34.

When the outside cylinder 34 having the above described structure is fit to outside of the orifice component 36 so as to surround the annular concave portion, an annular space is defined in the circumferential direction between the outside cylinder 34 and the orifice component 36 and then the diaphragm 42 is disposed in that annular space in a condition that it is bent as described above.

The inside cylinder 37 fit to inside of the orifice component 36 includes a smallest-diameter cylinder portion 37a formed to be smaller than the small-diameter cylinder portion 36c of the orifice component 36, and annular portions 37b and 37c are formed at upper and lower end portions of the smallest-diameter cylinder portion 37a so as to be directed outward in the diameter direction. The annular portion 37b at the upper end is formed such that the outside diameter thereof is slightly smaller than the small-diameter cylinder portion 36c of the orifice component 36. The annular portion 37c at the lower end is formed so as to be smaller than the lower end cylinder portion 36b of the orifice component 36, and a second opening portion 37d is formed in the smallest-diameter cylinder portion 37a.

As for the device case 43, an upper end caulking portion 43a having a circular opening portion having a diameter smaller than the outside diameter of the upper end cylinder portion 36a is formed at its upper end portion, and its main body continuous from this upper end caulking portion 43a has a cylinder shape extended up to its bottom end opening portion so as to have the same inside diameter as the outside diameter of the outside cylinder 34 (a shape indicated by broken lines at the bottom end opening portion in FIG. 2).

Then, the outside cylinder 34 in which the elastic support 32, the orifice component 36, the inside cylinder 37 and the diaphragm 42 are integrated therewith is inserted into inside of the device case 43 from its bottom end opening portion and by making the upper end portion of the outside cylinder 34 and the orifice component 36 into contact with a bottom surface of the upper end caulking portion 43a, they are disposed inside of the device case 43.

An air chamber 42c is defined in a space surrounded by the inside surface of the device case 43 and diaphragm 42.

An air vent hole 43a is formed at a position facing this air chamber 42c, and the air chamber 42c communicates with the atmosphere through this air vent hole 43a.

A cylindrical spacer 70 is fit to a lower portion of the device case 43, a movable member 78 is disposed at an upper portion of this spacer 70, and an electromagnetic actuator 52 is disposed at a lower portion of the spacer 70.

That is, the spacer 70 is a member in which a diaphragm 70c constituted of a rubber made thin film resilient body is fixed between an upper cylindrical body 70a and a lower cylindrical body 70b by vulcanized adhering.

The electromagnetic actuator 52 comprises a cylindrical yoke 52a, a circular excitation coil 52b embedded at the side of an upper end surface of the yoke 52 and a permanent magnet 52c fixed to a upper center portion of the yoke 52a such that its poles are directed up and down. The aforementioned yoke 52a comprises an upper yoke member 53a and a lower yoke member 53b, which are two divisions thereof in the vertical direction in FIG. 2. Then, a lower circumference of the upper yoke member 53a and a upper circumference of the lower yoke member 53b are ground off so as to form a concave portion 52d continuous in its circumferential direction. Then, a diaphragm 70c of the spacer 70 is bent toward the aforementioned concave portion 52d. An air chamber 70d is defined in a space surrounded by an inner surface of the device case 43 and the diaphragm 70c, and an air vent hole 43b is formed at a position facing this air chamber 70d so that the air chamber 70d communicates with the atmosphere thorough this air vent hole 43b. A load sensor 64 is disposed between the bottom surface of the yoke 52a and a lid member 62 provided with vehicle side connecting bolts 60 so as to detect a residual vibration necessary for control to reduce vibration. Although as the load sensor 64, a piezoelectric element, magnetostrictor, strain gauge and the like are available, the piezoelectric element is used in this embodiment. A detection result of this sensor is supplied to a controller 25 as a residual vibration signal "e" as shown in FIG. 1.

On the other hand, a seal ring 72 for fixing a sealing elastic member 86, a supporting ring 74 as a retainer for supporting a leaf spring and a gap holding or maintaining/setting ring 76 are disposed coaxially with the mount axis $P_1$ of vibrating body mounting direction in a upper portion of the inside of the spacer 70, and further, a movable member 78 capable of being displaced in the up and down direction is disposed inside of these rings. The seal ring 72, supporting ring 74 and gap holding ring 76 are ring members having the same outside diameter. These rings are fit firmly inside the upper cylindrical body 70a of the spacer 70 and the inner diameter of the upper cylindrical body 70a is set to the same as the outside diameters of the seal ring 72, supporting ring 74 and gap holding ring 76.

The movable member 78 comprises a partition wall forming member 78A formed in circular shape coaxial with the mount axis $P_1$ and a magnetic path forming member 78B formed in circular shape coaxial with the mount axis $P_1$ having a diameter larger than that of the partition wall forming member 78A. A bolt hole 80a is formed in the axis of the partition wall forming member 78A located at a far side with respect to the electromagnetic actuator 52. Then, by making a movable member bolt 80 pass through the magnetic path forming member 78B located at a near side with respect to the electromagnetic actuator 52 and screwing with the bolt hole 80a, the partition wall forming member 78A is integrated with the magnetic path forming member 78B.

Further, on an outer edge of the magnetic path forming member 78B is fixed a stopper member 78C constituted of a ring-like rubber resilient body so as to prevent a direct contact between the magnetic path forming member 78B and the electromagnetic actuator 52.

To reduce the size of the vibration insulating device 20 in its diameter direction, an outside diameter L1 of the magnetic path forming member 78B is set to be larger than an inside diameter L2 of the supporting ring 74. Such a structure is one of important elements for achieving the vibration insulating device 20 having a sufficient performance while securing a freedom of layout in a present situation in which restrictions on a design layout of peripheral components of the engine 17 or the like in an engine room of the vehicle 10 have specifically increased.

A constricted portion 79 which is continuous like a ring is defined between the partition wall forming member 78A and the magnetic path forming member 78B. A leaf spring 82 which is a resilient member for supporting the movable member 78 resiliently is accommodated in this constricted portion 79. That is, the leaf spring 82 is a disc-shaped member coaxial with the mount axis $P_1$ in which a hole portion is formed in the center thereof. An inner peripheral portion of this leaf spring 82 supports a center portion of the bottom side of the partition wall forming member 78A from lower side of the partition wall forming member 78A through a free end. An outer peripheral portion of the leaf spring 82 is supported by a convex-shaped ring 74a formed along an inner peripheral surface of the supporting ring 74 from a lower side of the leaf spring 82 trough free end. Consequently, the movable member 78 is resiliently supported by the device case 43 trough the leaf spring 82.

In the partition wall forming member 78A, a partition wall portion 80c, which is thin and faces a fluid chamber 84, and an annular rib 80b which protrudes upward from an outer periphery of the partition wall portion 80c are formed. Then, the fluid chamber 84 is formed by a top face of the partition wall forming member 78, a bottom face of the elastic support 32 and an inside peripheral surface of the inside cylinder 37 so that fluid is contained in this fluid chamber 84. To prevent a leakage of the fluid from the fluid chamber 84 to the side of the constricted portion 79 accommodating the leaf spring 82, a sealing elastic member 86 is provided between an outer periphery of the partition wall forming member 78A and an inner periphery of the seal ring 72.

The aforementioned sealing elastic member 86 is constituted of a ring-like rubber resilient member and its resilient deformation allows the movable member 78 to be displaced vertically relative to the seal ring 72 and the device case 43 in FIG. 2.

Here, a gap H provided between the permanent magnet 52C of the electromagnetic actuator 52 and the magnetic path forming member 78B of the movable member 78 is set to a predetermined length by making both of a so-called assembly part, in which the movable member 78, seal ring 72, a sealing elastic member 86, a leaf spring 82 and a supporting ring 74 are previously integrated, and the gap holding ring 76 into contact with a top surface of the yoke 52a.

Figure 3:
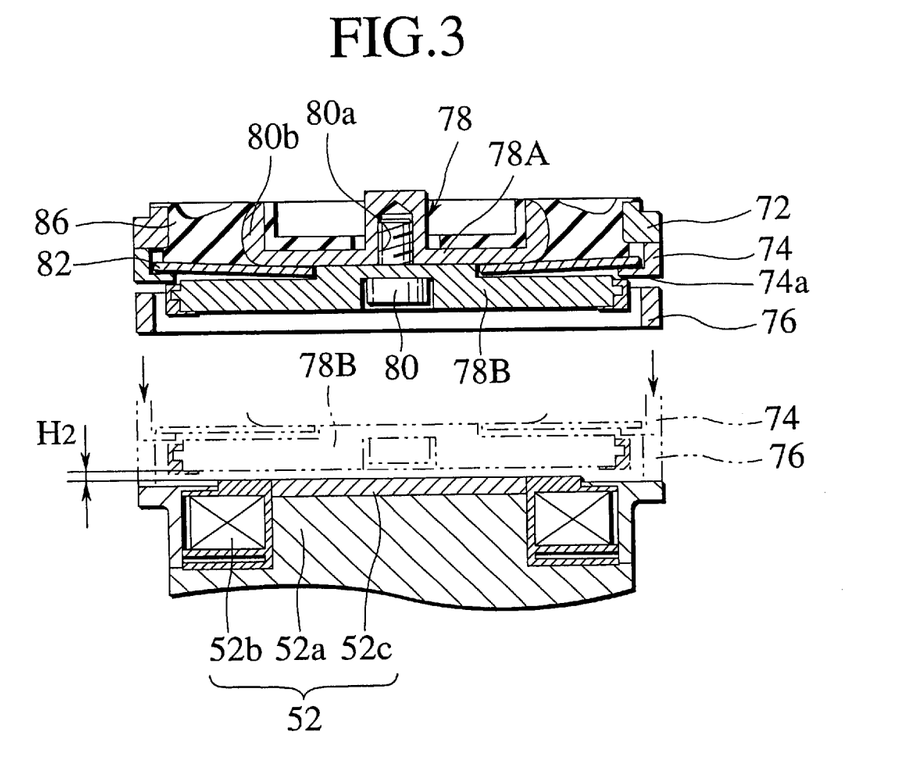
FIG. 3 is a partially sectional view showing an assembly part and gap holding member of the vibration insulating device of the first embodiment.

As shown in FIG. 3, the partition wall forming member 78A and the magnetic path forming member 78B of the movable member 78 are connected with a movable member bolt 80 in such a condition that the leaf spring 82 and the convex-shaped ring 74a of the supporting ring 74 are positioned between them. The sealing elastic member 86 is fixed between the seal ring 72 disposed on the supporting ring 74 and the partition wall forming member 78A. In this manner, the assembly part is formed. After the gap holding ring 76 is disposed below this assembly part, it is set on a top end of the yoke 52a and whether or not the gap H is within a predetermined allowance is checked. At this time, if the measured gap $H_2$ is out of the allowance of the predetermined gap H, a new gap holding ring 76 having a different height from the currently used gap holding ring 76 is disposed below the assembly part instead and selection of such a new gap holding ring 76 is repeated until the gap H surely comes into the predetermined allowance. Meanwhile, this measurement is conducted at four points which are symmetrical relative to the mount axis $P_1$.

In the mean time, the excitation coil 52b of the electromagnetic actuator 52 generates a predetermined electromagnetic force depending on a driving signal "y" which is a current supplied from the controller 25 shown in FIG. 1. The controller 25 comprises a microcomputer, necessary interface circuit, A/D converter, D/A converter, amplifier, memory medium such as ROM and RAM or the like, and generates and outputs the driving signal "y" to the vibration insulating device 20 so as to produce an active mounting force in the vibration insulating device 20 for reducing the vibration generated by the engine 17.

In the case of reciprocating 4-cylinder, 4-cycle engine, for example, the idling vibration or the indistinct sound vibration generated from the engine 17 are produced mainly because engine vibration which is a so-called engine revolution secondary component is transmitted to the vehicle body 18. Thus, if the driving signal "y" is produced synchronously with that engine revolution secondary component, the vibration of the vehicle body 18 can be reduced. Therefore, according to this embodiment, a pulse signal generator 19 which produces an impulse signal synchronously with a rotation of a crank shaft of the engine 17 (e.g., in the case of the reciprocating 4-cylinder engine, an impulse signal is produced every rotation by 180° of the crank shaft) and outputs as a reference signal "x" is provided, and that reference signal "x" is supplied to the controller 25.

The controller 25 executes so-called synchronous Filtered XLMS algorithm which is a sequentially renewal-type adaptive algorithm based on the residual vibration signal "e" and reference signal "x" so as to calculate the driving signal "y" to the vibration insulating device 20 and output that driving signal "y" to the vibration insulating device 20.

Speaking concretely, the controller 25 has an adaptive digital filter W capable of varying a filter coefficient $W_i$ (i=0, 1, 2, . . . , I–1: I is tap number) and, from the time when a current reference signal "x" is input, the controller 25 outputs the filter coefficient $W_i$ of the adaptive digital filter W at a predetermined sampling clock interval as the driving signal "y". On the other hand, the controller 25 executes a processing for renewing the filter coefficient $W_i$ of the adaptive digital filter W based on the reference signal "x" and residual vibration signal "e".

The renewal formula of the adaptive digital filter W is expressed in the form of an formula based on the Filtered-X LMS algorithm.

$$W_i(n+1)=W_i(n)-\mu R^T e(n)$$

Wherein, terms with (n), (n+1) respectively indicate values at the time of sampling time n, n+1, and $\mu$ is a convergence coefficient. Further, theoretically, the renewing reference signal $R^T$ is a value obtained by filter processing with respect to the reference signal "x" with a transmission function filter C^ which is obtained by modeling a transmission function C between the electromagnetic actuator 52 and the load sensor 64 of the vibration insulating device 20 by use of a finite impulse response-type filter. Since the magnitude of the reference signal "x" is "1", the value of the renewing reference signal $R^T$ coincides with a sum of the impulse response waveforms at the sampling time n when the impulse response of the transmission function filter C^ is generated in sequential synchronously with the reference signal "x". Although, theoretically, the reference signal "x" is filtered with the adaptive digital filter W so as to generate the driving signal "y", since the magnitude of the reference signal "x" is "1", even if the filter coefficient $W_i$ is output in sequential as the driving signal "y", the same result is obtained as when the result of the filtering processing is used as the driving signal "y".

Next, an operation of the vibration insulating device of this embodiment will be described.

That is, in a condition in which the idling vibration or the indistinct sound vibration is generated from the engine 17, the filter coefficient $W_i$ of the adaptive digital filter W is supplied in sequential as the driving signal "y" to the electromagnetic actuator 52 of the vibration insulating device 20 from the controller 25, at the predetermined sampling clock interval from the time when the reference signal "x" is input.

As a result, a magnetic force is generated in the excitation coil 52c corresponding to the driving signal "y". Then, it can be considered that that magnetic force from the excitation coil 52c strengthens or weakens the magnetic force of the permanent magnet 52c because the magnetic path forming member 78B has been already applied with a certain level of the magnetic force by the permanent magnet 52c. That is, when no driving signal "y" is supplied to the excitation coil 52b, the movable member 78 including the magnetic path forming member 78B is displaced at a position in which a supporting force of the leaf spring 82 is balanced with the magnetic force of the permanent magnet 52c. Then, when the driving signal "y" is supplied to the excitation coil 52b in this neutral state and the magnetic force generated in the excitation coil 52b by the driving signal "y" is opposite to the magnetic force of the permanent magnet 52c, the movable member 78 is displaced in a direction in which the gap relative to the electromagnetic actuator 52 is increased. On the contrary, if the magnetic force generated in the excitation coil 52b is in the same direction as the magnetic force of the permanent magnet 52c, the movable member 78 is displaced in a direction in which the gap relative to the electromagnetic actuator 52 is decreased.

As described above, the movable member 78 can be displaced in both ways. If the movable member 78 is displaced, the partition wall forming member 78A forming a part of the partition wall of the fluid chamber 84 is also displaced, so that the volume of the fluid chamber 84 is changed. Due to the change of the volume, the so-called expansion spring of the elastic support 32 is changed. Thus, the active mounting force in both positive and negative directions is generated in the vibration insulating device 20.

Each filter coefficient $W_i$ of the adaptive digital filter which generates the driving signal "y" is renewed sequentially according to the aforementioned formula based on the synchronous Filtered-X LMS algorithm. Therefore, after a certain time has been passed and each filter coefficient $W_i$ of the adaptive digital filter W is converged to an optimum value, by supplying the driving signal "y" to the vibration insulating device 20, the idling vibration or the indistinct sound vibration which is transmitted from the engine 17 to the vehicle body 18 through the vibration insulating device 20 is reduced.

In this embodiment, the assembly part in which the movable member 78, seal ring 72, sealing elastic member 86, leaf spring 82 and supporting ring 74 are integrated is used. After the gap holding ring 76 is disposed below this assembly part, it is set on the yoke 52a and then another gap holding ring 76 having a different height is selected appropriately until the gap H between the permanent magnet 52C and the magnetic path forming member 78B comes within a predetermined allowance. As a result, for example, a complex procedure in which connection or separation of the partition wall forming member and magnetic path forming member is repeated is eliminated, and thereby making it possible to reduce time and labor necessary for assembly of the vibration insulating device 20.

Further, because the seal ring 72, supporting ring 74, and gap holding ring 76 are fit to the upper cylindrical body 70a of the spacer 70 coaxially with the mount axis $P_1$, they can be installed without occurring a looseness or the like between the respective parts. Further, the gap holding ring 76 can be replaced easily and securely, so that the assembly performance of the vibration insulating device 20 can be improved.

Therefore, the gap H between the permanent magnet 52C of the electromagnetic actuator 52 and the magnetic path forming member 78B of the movable member 78 can be set at a high precision, it is possible to stabilize the volume change of the fluid chamber 84, that is, vibration insulation performance thereof.

In this embodiment, the gap holding ring 76 corresponds to the gap holding member, the seal ring 72 corresponds to the first supporting member, and the supporting ring 74 corresponds to the second supporting member. The leaf spring 82 is supported by the first and second supporting members as a result, and the upper cylindrical body 70a of the spacer 70 corresponds to the spacer member.

Next, the vibration insulating device according to a second embodiment of the present invention and an assembly method therefof will be described with reference to FIG. 4.

Because this embodiment has the basically same structure as that of the first embodiment, the same reference numerals are attached to the same components, and the description on the same structure and processing is omitted.

Figure 4:
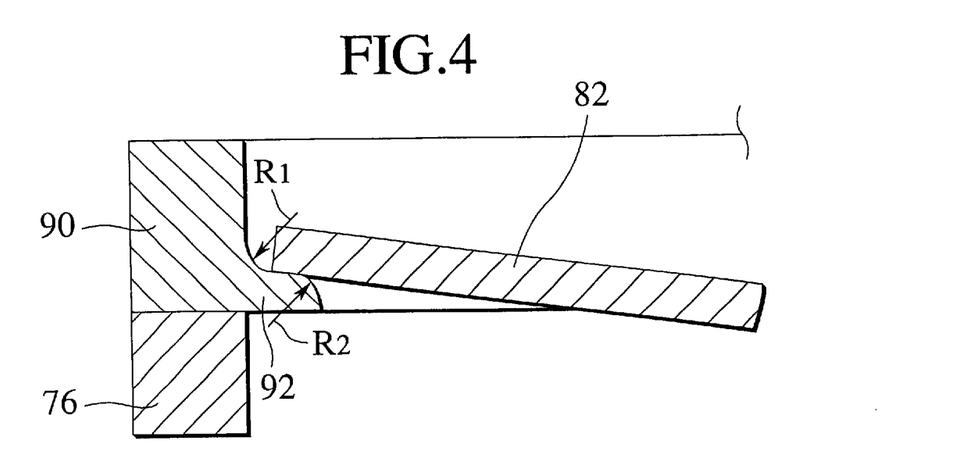
FIG. 4 is a partially sectional view showing a supporting ring of the vibration insulating device according to a second embodiment of the present invention.

As shown in FIG. 4, a supporting ring 90 of this embodiment is a ring-like member having the same outside diameter as the seal ring 72 and gap holding ring 76, and a convex-shaped ring 92 is formed on an inside circumference of the supporting ring 90. A first curvature surface $R_1$ curved downward is formed to be continuous along its circumferential direction around an upper face of a proximal end of this convex-shaped ring 92, and further a second curvature surface $R_2$ curved upward is formed also on a upper face continuous from the first curvature surface $R_1$ to an inner end such that the second curvature surface $R_2$ is continuous along its circumferential direction.

The leaf spring 82 supporting the movable member 78 resiliently supports the center portion of the bottom side of the partition wall forming member 78A from a lower side of the partition wall forming member 78A through a free end by the inner peripheral portion thereof. The outer peripheral portion of the leaf spring 82 is supported by the first and second curvature surfaces $R_1$ and $R_2$ of the aforementioned convex-shaped ring 92 from down side thereof through a free end.

Because the outer peripheral portion of the leaf spring 82 is so structured as to contact the first and second curvature surfaces $R_1$ and $R_2$ of the convex-shaped ring 92, the contact surface pressure between the supporting ring 90 and the leaf spring 82 is reduced. Thus, the amount of wear of the supporting ring 90 and leaf spring 82 is also reduced, and further the fatigue of the leaf spring 82 always displaced in the vertical direction can be prevented. Therefore, if the supporting ring 90 of this embodiment is used, the durability of the leaf spring 82 can be largely improved.

Here, the convex-shaped ring 92 of this embodiment corresponds to the supporting portion.

The vibration insulating device and assembly method thereof according to the respective embodiments described above are not restricted to application thereof to a vehicle, and the present invention can be applied to other apparatus for reducing a vibration generated by other elements than the engine 17. Regardless of the application object, the same operation and effect as the respective embodiments described above can be achieved. For example, the present invention can be applied to a vibration insulating device for reducing a vibration transmitted from a machine tool to a floor or a room.

Although in the respective embodiments above, the synchronous Filtered-X LMS algorithm is used as an algorithm for generating the driving signal "y", the applicable algorithm is not restricted to this one, but for example, ordinary Filtered-X LMS algorithm or the like can be used instead.

The entire contents of a Patent Application No. TOKUGANHEI 10-38313, with a filling date of Feb. 20, 1998 in Japan, are hereby incorporated by reference.

Although the invention has been described above by reference to certain embodiments of the invention, the invention is not limited to the embodiments described above. Modifications and variations of the embodiments described above will occur to those skilled in the art, in light of the teachings. The scope of the invention is defined with reference to the following claims.

What is claimed is:

1. A vibration insulating device interposed between a vibrating body and mounting body, said vibration insulating device comprising:
    a fluid chamber filled with fluid;
    an elastic support partly defining said fluid chamber;
    a movable member partly defining said fluid chamber, said movable member including:
        a partition wall which partly defines said fluid chamber, and
        a magnetic path which is connected to said partition wall on a side of said partition wall which is opposite said fluid chamber;
    an actuator opposed to said movable member, said actuator generating displacement force to displace said movable member;
    a retainer disposed between said partition wall and said actuator, and an inner dimension of said retainer being less than an outer dimension of said magnetic path;
    a supporting member supporting said movable member, said supporting member supporting said partition wall at an inner portion thereof, and being supported by said retainer at an outer portion thereof; and
    a gap holding member disposed between said supporting member and said actuator, said gap holding member maintaining a gap between said actuator and said movable member.

2. A vibration insulating device according to claim 1, wherein said actuator includes an electromagnetic actuator, and said movable member includes magnetizable material.

3. A vibration insulating device according to claim 1, further comprising a cylindrical device case connecting to said elastic support, wherein said supporting member, said movable member, said gap holding member, and said actuator are installed in said cylindrical device case.

4. A vibration insulating device according to claim 1, wherein said resilient supporting member is a leaf spring.

5. A vibration insulating device according to claim 1, wherein said supporting member is a circular leaf spring having a hole portion formed in a center thereof, and said leaf spring supports said partition wall at an inner peripheral portion around said hole portion and is supported by said retainer at an outer peripheral portion of said circular leaf spring.

6. A vibration insulating device according to claim 4, wherein said gap holding member is disposed between said retainer and said actuator.

7. A vibration insulating device according to claim 4, wherein said movable member has a constricted portion which is formed between said partition wall and said magnetic path, and said leaf spring supports said movable ember at said constricted portion.

8. A vibration insulating device according to claim 1, further comprising a sealing member disposed between said elastic support and said partition wall.

9. A vibration insulating device according to claim 8, wherein said sealing member includes a seal ring disposed between said elastic support and said supporting member, and further comprising an elastic member which is fixed to said movable member and said seal ring.

10. A vibration insulting device according to claim 8, wherein said sealing member, said movable member, and said supporting member are incorporated integrally to form an assembly part.

11. A vibration insulating device according to claim 1, wherein an outer diameter of said magnetic path is larger than an inner diameter of said retainer.

12. A vibration insulating device according to claim 1, wherein said retainer includes a supporting portion to support said supporting member, and said supporting portion has a convex shaped portion in contact with said supporting member.

13. A vibration insulating device interposed between a vibrating body and mounting body, said vibration insulating device comprising:
   a fluid chamber filled with fluid;
   an elastic support partly defining said fluid chamber;
   a movable member partly defining said fluid chamber, said movable member including:
      a partition wall which partly defines said fluid chamber, and
      a magnetic path which is connected to said partition wall on a side of said partition wall which is opposite said fluid chamber;
   actuator means for displacing said movable member;
   a retainer disposed between said partition wall and said actuator, and an inner dimension of said retainer being less than an outer dimension of said magnetic path;
   means for supporting said movable member, said supporting means including a support member which supports said partition wall at an inner portion thereof and which is supported by said retainer at an outer portion thereof; and
   position adjusting means, provided between said means for displacing and said elastic support, for adjusting a gap between said movable member and said actuator means.

14. A vibration insulting device as set forth in claim 13, further comprising a housing, said housing enclosing at least said actuator means and said position adjusting means.

15. A vibration insulating device interposed between a vibrating body and mounting body, said vibration insulating device comprising:
   a housing member;
   an elastic support connected with said housing member so as to partly define a fluid chamber;
   a movable member disposed in said housing member to partly define the fluid chamber;
   a supporting member which supports said movable member, disposed in said housing member;
   an actuator enclosed within said housing member and disposed opposite to said movable member for displacing said movable member; and
   an interchangeable gap holding member which is discrete from said housing member and disposed within said housing member between said supporting member and said actuator, said gap holding member establishing a predetermined gap between said actuator and said movable member, and wherein said housing member comprises a single cylindrical member which encloses the fluid chamber, said movable member, said supporting member, said actuator and said interchangeable gap holding member.

16. An assembly method of a vibration insulating device, comprising:
   preparing an elastic support connecting to a vibrating body and partly defining a fluid chamber;
   preparing a movable member which partly defines said fluid chamber said movable member including;
      a partition wall which partly defines said fluid chamber, and
      a magnetic path which is connected to said partition wall on a side of said partition wall which is opposite said fluid chamber;
   preparing a force generating actuator to displace said movable member and connect said actuator to a mounting body;
   preparing a retainer and disposing said retainer between said partition wall and said actuator, an inner dimension of said retainer being less than an outer dimension of said magnetic path;
   preparing a supporting member which supports said movable member, said supporting member supporting said partition wall at inner portion thereof and being supported by said retainer at an outer portion thereof;
   preparing a gap holding member maintaining member for maintaining a gap between said movable member and said actuator;
   supporting said movable member with said supporting member and said gap holding member in such a manner that said movable member is capable of being displaced and opposes said actuator, said gap holding member being positioned between said supporting member and said actuator; and
   defining a fluid chamber accommodating a fluid with said elastic support and said movable member, a volume of said fluid chamber being capable of being varied by displacement of said movable member.

17. An assembly method of a vibration insulating device according to claim 16, wherein said gap holding member is prepared in plural quantity, and said gap between said movable member and said connecting member is set to a predetermined gap with a plurality of gap holding members.

18. An assembly method of a vibration insulating device according to claim 17, wherein said predetermined gap is a gap within a predetermined allowance.

19. An assembly method of a vibration insulating device, comprising:

preparing an elastic support connecting to a vibrating body and partly defining a fluid chamber;

preparing a movable member which partly defines said fluid chamber;

preparing a supporting member which supports said movable member;

preparing a force generating actuator to displace said movable member and connecting said actuator to a mounting body;

preparing a gap holding member maintaining member for maintaining a gap between said movable member and said actuator, said gap holding member being interchangeable with a gap holding member of a different size whereby the gap between said movable member and said actuator is correctable to a predetermined distance by interchanging the holding member with another gap holding member;

supporting said movable member with said supporting member and said hold holding member in such a manner that said movable member is capable of being displaced and opposes said actuator, said gap holding member being positioned between said supporting member and said actuator; and defining a fluid chamber accommodating a fluid with said elastic support and said movable member, a volume of said fluid chamber being capable of being varied by displacement of said movable member.

20. An assembly method of a vibration insulating device according to claim 16, further comprising the steps of measuring the gap and, in the event that the gap does not correspond to a predetermined value, replacing the gap holding member with another of a different size until the gap is set at the predetermined value.

* * * * *